United States Patent
Weber

(10) Patent No.: US 6,386,192 B1
(45) Date of Patent: May 14, 2002

(54) PORTABLE OUTDOOR OPEN FIRE COOKING GRILL ASSEMBLY

(76) Inventor: LeRoy R. Weber, 2101 Polzin Rd., Janesville, WI (US) 53545

(*) Notice: Subject to any disclaimer, the term of this patent is extended or adjusted under 35 U.S.C. 154(b) by 0 days.

(21) Appl. No.: 09/499,972

(22) Filed: Feb. 8, 2000

(51) Int. Cl.$^7$ .................................................. A47J 33/00
(52) U.S. Cl. ....................................... 126/30; 126/25 A
(58) Field of Search ........................... 126/29, 30, 9 R, 126/25 A, 9 B, 25 R; 248/218.4, 122.1, 123.11

(56) References Cited

U.S. PATENT DOCUMENTS

| | | | |
|---|---|---|---|
| 3,067,734 A | * 12/1962 | Lucas | 126/30 |
| 3,344,780 A | 10/1967 | Anderson | |
| 3,537,388 A | * 11/1970 | Martin | 126/30 |
| 4,351,312 A | 9/1982 | Ivey | 126/30 |
| 4,607,608 A | 8/1986 | Allred et al. | 126/30 |
| 4,854,297 A | 8/1989 | Shuman | 126/30 |
| 4,979,490 A | 12/1990 | Nudo et al. | 126/30 |
| 5,117,806 A | 6/1992 | Soat | 126/30 |
| 5,307,797 A | 5/1994 | Kleefeld | 126/30 |
| 5,666,940 A | 9/1997 | Kreiter | 126/30 |
| 5,758,570 A | * 6/1998 | Hill | 126/9 B |
| 5,819,718 A | 10/1998 | Leiser | 126/30 |
| 6,070,571 A | * 6/2000 | Bradbury | 126/25 A |

* cited by examiner

Primary Examiner—Sara Clarke
(74) Attorney, Agent, or Firm—Michael Best & Friedrich LLP; Jeffrey D. Peterson

(57) ABSTRACT

A portable cooking grill assembly having a cooking grill portion for holding food over an open fire and a support portion for supporting the grill portion over the fire. The invention is characterized in that the location of the grill portion along the post is adjustable so as to regulate the heat and flame intensity of the fire in terms of cooking the food. More particularly, the portable cooking grill assembly comprises a support post, a grill grate holder having a handle and a grill grate support attached to an end of the handle, and a cooking grill grate supported by the grill grate support. After the post is set in the ground, the grill grate holder is positioned over and onto the post such that the post is received by an opening defined between the handle and the grill grate support. The handle is lighter in weight than the grill grate support so that when the handle is released, the weight distribution of the handle and grill grate support will cause a frictional engagement between the post and the grill grate holder such that the grill grate holder will be substantially locked to the post. In order to adjust the location of the grill grate holder along the post or to remove the grill grate holder from the post, a downward force is applied to the handle to release the locking frictional engagement between the post and the grill grate holder and the grill grate holder is simply moved up or down the post as desired.

15 Claims, 1 Drawing Sheet

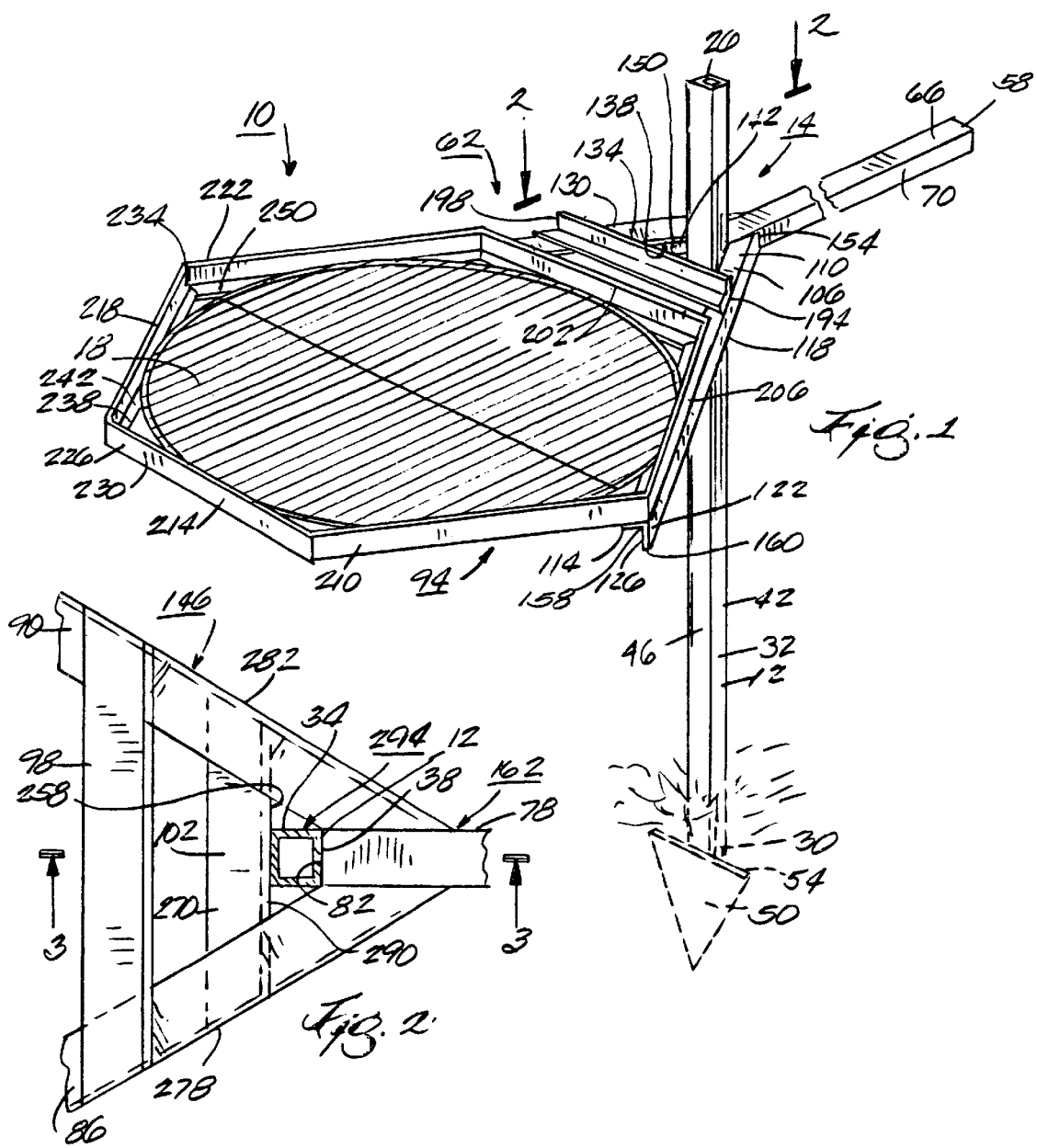
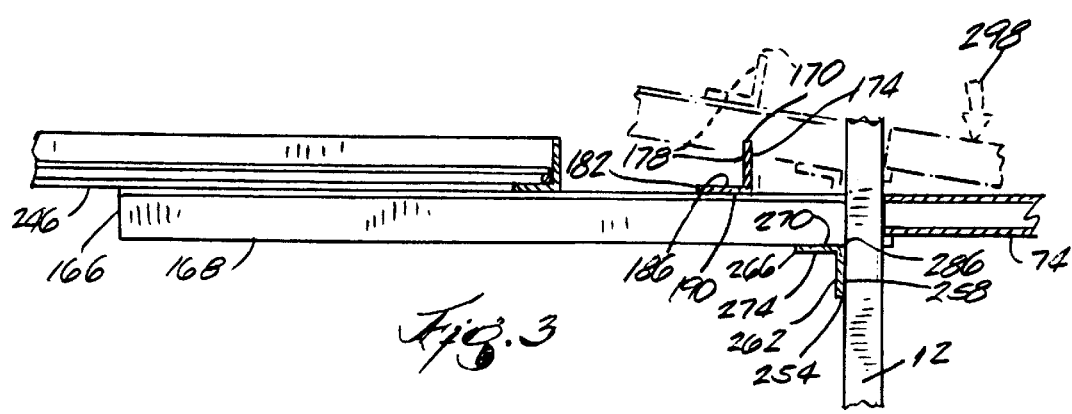

PORTABLE OUTDOOR OPEN FIRE COOKING GRILL ASSEMBLY

FIELD OF THE INVENTION

The present invention relates generally to cooking equipment and, more particularly, to a portable, easily assembled grill assembly for cooking food outdoors.

BACKGROUND OF THE INVENTION

Grill assemblies for cooking food over an open fire are well known. Many of these known grill assemblies include means for adjusting the height of a cooking grill grate above the fire in order to regulate the heat intensity of the cooking fire. Such known grill assemblies typically include locking mechanisms such as friction grip slides, lock nuts, notches, stop lugs, coupling members with fingers and jaws, or the like, to secure the cooking grill grate to an upstanding support stake placed in the ground. Many of these locking mechanisms are made of multiple or complex locking devices which make such portable grill assemblies difficult to assemble, disassemble and use.

While many of the known portable outdoor open fire cooking grill assemblies work as intended, given the ever-increasing interest in traveling, camping and other outdoor activities, there still remains a need for a portable outdoor open fire cooking grill assembly which is not complicated to make or use, which is light-weight yet sturdy, which is easy to erect, take down, transport and store as desired, and which includes a cooking grill grate having an adjustable height.

SUMMARY OF THE INVENTION

The present invention provides a new and improved light-weight, portable outdoor open fire cooking grill assembly that is easily assembled in a secure and sturdy manner, that is readily disassembled for the purpose of storage or movement from one location to another, that comprises a limited number of components, and that is simple and inexpensive to manufacture. More particularly, the present invention provides a new portable outdoor open fire cooking grill assembly which includes a cooking grill grate which is easily and efficiently secured to a support post at various locations along the post according to the desired heat intensity of the cooking fire.

The foregoing and other features of the present invention are realized in one aspect thereof in a portable outdoor open fire cooking grill assembly comprising a support post, a grill grate holder and a cooking grill grate. The post includes a lower end portion adapted to be driven into the ground. The grill grate holder includes a handle and a grill grate support attached to one end of the handle, wherein the handle weighs less than the grill grate support. The grill grate holder further includes an opening adapted to receive the post. Once the post is set in the ground, the post receiving opening of the grill grate holder is positioned over the post so that the grill grate holder can be positioned onto the post. To secure the grill grate holder to the post, the handle of the grill grate support is simply released and the weight differential between the handle and the grill grate support will cause the grill grate holder to substantially frictionally engage or cinch the post. To remove the grill grate holder from the post or adjust the height of the grill grate holder, and thus the cooking grill grate, along the length of the post, the handle is caused to move in a downward direction relative to the ground in order to release the frictional engagement or cinching action between the grill grate holder and the post. Thereafter, the grill grate holder can be moved up or down the post as desired.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a perspective view of a portable outdoor open fire cooking assembly according to the present invention.

FIG. 2 is a partial cross-sectional view taken along line 2—2 of FIG. 1.

FIG. 3 is a partial cross-sectional view taken along line 3—3 of FIG. 2 with additional portions of the grill grate holder and cooking grill grate of FIG. 1 also shown. FIG. 3 further illustrates, in phantom, how the handle can be moved in a downward direction relative to the ground thereby releasing the frictional engagement or cinching action between the grill grate holder and the post so that the grill grate holder can be moved up and down along the post.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting.

DETAILED DESCRIPTION OF THE PREFERRED EMBODIMENT

This invention relates generally to outdoor barbecue grill assemblies and, in particular, to portable outdoor grill assemblies. The invention is characterized by the ability of a cooking surface to be easily moved up and down along a support post and locked to the support post without the use of additional locking fasteners or mechanisms. Referring more particularly to the drawings, FIGS. 1–3 illustrate the portable outdoor open fire cooking grill assembly according to the present invention. FIG. 1 specifically shows the grill assembly in an assembled, ready to use position, it being understood that the grill assembly can be disassembled for transportation and storage, as will be apparent from below.

The grill assembly 10 includes a support post 12, a grill grate holder 14 and a cooking grill grate 18. Preferably, the post 12 is made of steel, the grill grate holder 14 is made of aluminum, and the cooking grill grate 18 is made of cast iron or stainless steel. However, the post, the grill grate holder and/or the cooking grill grate can be made of many different materials according to the principles of the present invention.

The post 12 has an upper end 26 and a lower end 30. Preferably, the post 12 further has an elongated, hollow rectangular body 32 having a generally uniform square cross-section defined by four sides 34, 38, 42 and 46. A planar, triangular shaped spade 50 is attached to the lower end 30 of post 12 for aiding in inserting post 12 into the ground. A person may step on the upper surface 54 of spade 50 so as to drive post 12 into the ground. Preferably, the spade 50 is made of steel and is welded to the post 12. Alternatively, although not shown, the lower end 30 of the post 12 could be suitably pointed for driving into the ground. Joined on opposite sides of the post 12, for example, sides 34 and 42, at locations disposed substantially equally upwardly from the pointed end, could be triangular shaped spades which may be welded to the sides 34 and 42, respectively, of the post 12. A person may step on the upper surface of one or both of these spades to aid in driving the pointed post into the ground.

The grill grate holder 14 includes a handle 58 and a grill grate support 62. The handle 58 is preferably an elongated, hollow rectangular tube having a generally uniform square cross-section defined by four sides 66, 70, 74, and 78. The handle 58 further includes two opposite ends 82 (only one shown). The grill grate support 62 includes a pair of arms 86 and 90, a grill grate receiver 94, a structural support member 98 and a post engaging member 102. Preferably, the arms 86 and 90 are elongated bars having a generally upside down, L-shaped cross section. Arm 86 includes a side 106 having an upwardly facing side 110 and a downwardly facing side 114, and a side 118 having an outwardly facing side 122 and an inwardly facing side 126. Likewise, arm 90 includes a side 130 having an upwardly facing side 134 and a downwardly facing side 138, and a side 142 having an outwardly facing side 146 and an inwardly facing side 150. Arm 86 further includes two opposite ends 154 and 158. Arm 90 further includes two opposite ends 162 and 166. End 154 of arm 86 and end 162 of arm 90 are clipped. Side 118 of arm 86 further has a downwardly facing edge 160 which extends between ends 154 and 158. Side 142 of arm 90 further has a downwardly extending edge 168 which extends between ends 162 and 166. End 154 of arm 86 is affixed to side 70 of handle 58 substantially near the end 82 of handle 58 so as to extend outward from end 82 and away from the opposite end of the handle 58. End 162 of arm 90 is affixed to side 78 of handle 58 substantially near the end 82 so as to extend outward from end 82 and away from the opposite end of the handle 58. Accordingly, the arms 86 and 90 are formed in a V-shape or, explained differently, the handle 58 and the arms 86 and 90 are formed in a Y-shape. Preferably, the arms 86 and 90 are welded to the handle 58.

The structural support member 98 is preferably an elongated bar having a generally upright L-shaped cross-section. The structural member 98 includes a side 170 having a post facing side 174 and an opposite facing side 178, and a side 182 having an upwardly facing side 186 and a downwardly facing side 190. The structural member 98 further includes opposite ends 194 and 198. Both ends, 194 and 198, are preferably clipped. The structural member 98 is positioned over arms 86 and 90 such that a portion of side 190 rests on side 110 of arm 86 and a portion of side 190 rests on side 134 of arm 90, and such that side 174 faces post 12. Preferably, the structural member 98 is located on arms 86 and 90 such that end 194 is substantially co-planar with side 122 of arm 86, and such that end 198 is substantially co-planar with side 146 of arm 90. Preferably, structural member 98 is welded to arms 86 and 90. The structural member 98 adds stability to the arms 86 and 90 if needed, for instance, when arms 86 and 90 are particularly long to accommodate a large cooking grill grate.

The grill grate receiver 94 is preferable in the shape of a hexagon. Preferably, the grill grate receiver 94 includes six elongated bars 202, 206, 210, 214, 218 and 222, each having a generally upright L-shaped cross-section, and each having substantially the same dimensions. The bars may be formed from a single bar having clipped ends and five equally spaced apart, clipped out V-shaped notches such that the single bar can be bent into the shape of a hexagon. Alternatively, the bars may be equally sized individual bars each having a pair of clipped ends such that the bars can be attached together, such as by welding, in the shape of a hexagon. In any event, each bar includes a side 226 having an outwardly facing side 230 and an inwardly facing side 234, and a side 238 having an upwardly facing side 242 and a downwardly facing side 246. The grill grate receiver 94 is attached to arms 86 and 90 as follows. Side 246 of bar 206 rests on side 110 of arm 86. Side 110 is longer than side 246 and, preferably, substantially the entire length of side 246 rests on side 110. To provide a clean looking appearance, side 230 of bar 206 is substantially co-planar with side 122 of arm 86 in the same manner as end 194 of structural member 98 is substantially co-planar with side 122. Side 246 of bar 222 rests on side 134 of arm 90. Side 134 is longer than side 246 and, preferably, substantially the entire length of side 246 rests on side 134. Again, to provide a clean looking appearance, side 230 of bar 222 is substantially co-planar with side 146 of arm 90 in the same manner as end 198 of structural member 98 is substantially co-planar with side 146. In addition, portions of side 246 of bar 202 rest on side 110 of arm 86 and side 134 of arm 90. Preferably, the grill grate receiver 94 is attached to arms 86 and 90 such that the ends 158 and 166 of the arms 86 and 90, respectively, do not extend substantially out past any portion of the outer perimeter of the grill grate receiver 94. Preferably, the grill grate receiver 94 is welded on to the arms 86 and 90.

The upwardly facing sides 242 of the bars of the grill grate receiver 94 form a ledge 250 for receiving the commercially available cooking grill grate 18. The grill grate 18 is preferably circular so as to allow for the easy placement and removal of the grill grate 18 from the grill grate receiver 94. Once assembled and ready for cooking, sides 226 of the bars of the grill grate receiver 94 prevent the grill grate 18 from undesirably sliding off of the grill grate receiver 94 which, if did occur, could result in the grill grate 18 and the food for cooking placed thereon to fall into the open cooking fire.

Post engaging member 102 is preferably an elongated bar having a generally upside down L-shaped cross-section. The post engaging member 102 includes a side 254 having a post facing side 258 and an opposite facing side 262, and a side 266 having an upwardly facing side 270 and a downwardly facing side 274. The post engaging member 102 further includes opposite ends 278 and 282. Both ends, 278 and 282, are preferably clipped. The post engaging member 102 is positioned beneath arms 86 and 90 such that a portion of side 270 is positioned against edge 160 of arm 86 and a portion of side 270 is positioned against edge 168 of arm 90, and such that side 258 faces post 12. Preferably, the post engaging member 102 is placed against arms 86 and 90 such that end 278 is substantially co-planar with side 122 of arm 86, and such that end 282 is substantially coplanar with side 146 of arm 90. With particular reference to FIG. 3, when the post engaging member 102 is viewed in cross-section, sides 258 and 270 define a point 286. With particular reference to FIG. 2, sides 258 and 270 define a plurality of points thereby defining a line 290 which extends between ends 278 and 282 of the post engaging member 102. Side 258 of post engaging member 102 is spaced apart from the end 82 of handle 58 a distance substantially equally to the cross-sectional dimension of the post 12 to define an opening 294, for reasons which will be explained below. Importantly, for reasons which will also be explained below, the point 286 or line 290 of post engaging member 102 is diagonally offset from side 74 of handle 58. Preferably, post engaging member 102 is welded to arms 86 and 90.

To assemble the grill assembly 10, the post 12 is driven into the ground. Once the post 12 is firmly implanted in the ground, the grill grate holder 14 is positioned over the upper end 26 of the post 12 such that the opening 294 is aligned over the post 12. The grill grate holder 14 is then moved down the post 12. Even though the dimension of the opening 294 between the end 82 of the handle 58 and the side 258 of the post engaging member 102 is substantially equal to the cross-sectional dimension of the post 12, the grill grate holder 14 can be moved up and down the post 12 because the point 286 or line 290 of the post engaging member 102 is diagonally offset from side 74 of handle 58. This diagonal offset provides enough clearance between the relevant surfaces of the grill grate holder 14 and the post 12 to allow for the movement of the grate holder 14 along the post 12. The overall weight of the grill grate support 62 is greater than the overall weight of the handle 58. Thus, when the grill grate holder 14 is positioned at a desirable height along the post 12, the user simply releases the grill grate holder 14 or handle 58 and the weight of the grill grate support 62, being greater than that of the handle 58, will result in a substantial frictional engagement or cinching action between the grill grate holder 14 and the post 12. In other words, when the grill grate holder 14 is released, the post 12 is captured between the handle 58 and the post engaging member 102 such that at least a portion of side 38 of post 12 is in frictional contact with at least a portion of end 82 of handle 58, and such that at least a portion of side 46 of post 12 is in frictional contact with at least a portion of side 258 of post engaging member 102. To enhance the locking action of the grill grate holder 14 to the post 12, the frictional engagement surfaces are preferably substantially flat.

Preferably, the dimensions of the post 12, the opening 294 and the diagonal offset between the handle 58 and the post engaging member 102 are such that, when assembled and ready for use, the grill grate holder 14 is substantially horizontal to the ground or substantially perpendicular to the post 12. When so assembled and ready for use, the cooking grill grate 18 can simply be placed on the ledge 250 of the grill grate receiver 94.

To remove the grill grate holder 14 from the post 12 or adjust the height of the grill grate holder 14 along the post 12, the user simply pushes down on the handle 58 (as shown in FIG. 3 by arrow 298) to release the substantial frictional engagement or cinching action between the post 12 and the grill grate holder 14 and moves the grill grate holder 14 up or down the post 12 as desired. The grill grate holder 14 can again be locked to the post 12, if the user simply releases the grill grate holder 14 as previously explained. Incidentally, for safety reasons and for ease of handling, it may be desirable to remove the cooking grill grate 18 from the grill grate receiver 94 prior to moving the grill grate holder 14.

The present invention is further explained by the following example which is not to be construed to limit the scope of the present invention.

EXAMPLE

A portable outdoor open fire cooking grill assembly having the following dimensions and characteristics was made.

The support post was made of a one inch by one inch square steel tube with a 14 gauge wall thickness. The overall length of the post was five feet. One end of the post included a wedge cut through two opposite sides which were bent in and welded to form a pointed end. Two right triangular bars (spades) each included a five inch long leg and a three inch short leg. The triangular bars had a three-eighths of an inch wall thickness. The long legs were welded to opposite sides of the post, respectively, such that the upper surfaces of the short legs were located one foot above the pointed end of the post and perpendicular to the post so that the upper surfaces were used to aid in driving the post into the ground.

The handle was made of a one inch by one inch square aluminum tubing with a 14 gauge wall thickness. The overall length of the handle was two feet and six and one-quarter inches.

The arms of the grill grate support were made of one and one-quarter inches by one and one-quarter inches L-shaped aluminum bars, each with a one-eighth of an inch wall thickness. The overall length of each arm was two feet and one-quarter of an inch. The overall length of the clipped end of each arm in relation to the overall length of the respective arm was two and three-sixteenths inches. The arms were welded to the handle to form a Y-shaped structure.

The structural support member was made of a one and one-quarter inches by one and one-quarter inches L-shaped aluminum bar with a one-eighth of an inch wall thickness. The overall length of the structural member was nine inches. The overall length of each clipped end of the structural member in relation to the overall length of the structural member was three-quarters of an inch. The structural member was welded to the arms such that the post facing side was designed to be located three and one-quarter inches from the relevant end of the handle.

The grill grate receiver was made of a one and one-quarter inches by one and one-quarter inches L-shaped aluminum bar with a one-eighth of an inch wall thickness. The overall length of the grill grate receiver bar was six feet and four and one-half inches. The bar was notched into six equally spaced and sized bars, each having a length of one foot and three-quarters of an inch between each notch. The single bar was bent to form a hexagonal grill grate receiver having six equal sides. The distance between the outwardly facing sides of each pair of opposite bars was one foot and ten and one-sixteenth inches. The grill grate receiver was welded to the arms such that the overall length of the grill grate holder from the outermost end of the handle to the outermost outer surface of the grill grate receiver was five feet and one and one-quarter inches.

The cooking grill grate was a stainless steel standard circular grill with a diameter of twenty-two and one-half inches.

The post engaging member was made of a one and one-quarter inches by one and one-quarter inches L-shaped aluminum bar with a one-eighth of an inch wall thickness. The overall length of the post engaging member was six and one-half inches. The overall length of each clipped end of the post engaging member in relation to the overall length was three-quarters of an inch. The post engaging member was welded to the arms such that the post facing side was located one inch from the relevant end of the handle. This one inch distance was the same as the one inch square dimension of the post.

The dimensions of the handle and the dimensions of the arms of the grill grate support allowed the post engaging member to be offset from the bottom of the handle along a diagonal for the reasons previously set forth.

It will now be recognized that a new and improved portable campfire grill assembly has been disclosed. The assembly can be dismantled into only three separate components for ease of transport and storage, can be quickly and easily assembled and adjusted at the campfire site, and is very stable and sturdy during use.

Variations and modifications of the foregoing are within the scope of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An adjustable outdoor portable assembly for cooking food over an open fire, said assembly comprising:
   an elongated support post having a lower ground penetrating end and an upper end; and
   a grill grate holder including an elongated handle and a grill grate support for supporting a cooking grill grate, said grill grate support including a first arm and a second arm which extend from opposite sides of said handle such that said handle and said arms are formed in a substantially Y-shape, said grill grate holder further including a first post engaging member supported by said arms and a second spaced apart post engaging member defining an opening therebetween, said first post engaging member being diagonally offset from said second post engaging member, said handle weighing less than said grill grate support, said grill grate holder being movable up and down along said post when said post is implanted in the ground by placing said opening over said upper end of said post and then around said post, and said grill grate holder being securable to said post at different heights along said post when said grill grate holder is released since said grill grate support weighs more than said handle which will thereby cause a substantial frictional engagement between said post engaging members and said post when said grill grate holder is released.

2. An assembly according to claim 1, further comprising:
   a spade attached to said lower end of said post to aid in driving said post into the ground.

3. An assembly according to claim 1, wherein said post has a square cross-section defined by four sides.

4. An assembly according to claim 1, wherein said handle has a square cross-section defined by four sides.

5. An assembly according to claim 1, wherein said grill grate support further includes a structural member attached to said arms to provide stability to said arms.

6. An assembly according to claim 1, wherein said grill grate support includes a post engaging member to define said opening between said post engaging member and an end of said handle.

7. An assembly according to claim 1, wherein said grill grate support includes a grill grate receiver in the shape of a hexagon for supporting the cooking grill grate.

8. An assembly according to claim 1, wherein said post is made of steel and said grill grate holder is made of aluminum.

9. An adjustable outdoor portable assembly for cooking food over an open fire, said assembly comprising:
   an elongated support post having a lower ground penetrating end and an upper end, said post having opposite sides which are substantially flat;
   a grill grate holder including an elongated handle and a grill grate support for supporting a cooking grill grate, said handle including opposite ends wherein one end is substantially flat, said grill grate support including a first arm and a second arm which extend from opposite sides of said handle such that said handle and said arms are formed in a Y-shape, said grill grate support further including a post engaging member attached to said arms, said post engaging member including a substantially flat side which is substantially parallel with said flat end of said handle, said flat side of said post engaging member and said flat end of said handle defining an opening therebetween, said handle weighing less than said grill grate support, said grill grate holder being movable up and down along said post when said post is implanted in the ground by placing said opening over said upper end of said post and then around said post, and said grill grate holder being securable to said post at different heights along said post by releasing said grill grate holder which will thereby cause a substantial frictional engagement between said flat end of said handle and one of said flat sides of said post and which will also thereby cause a substantial frictional engagement between said flat side of said post engaging member and said opposite flat side of said post on account of said grill grate support weighing more than said handle.

10. An assembly according to claim 9, further comprising:
    a spade attached to said lower end of said post to aid in driving said post into the ground.

11. An assembly according to claim 9, wherein said post has a square cross-section defined by four sides.

12. An assembly according to claim 9, wherein said handle has a square cross-section defined by four sides.

13. An assembly according to claim 9, wherein said grill grate support further includes a structural member attached to said arms to provide stability to said arms.

14. An assembly according to claim 9, wherein said grill grate support further includes a grill grate receiver in the shape of a hexagon for supporting the cooking grill grate.

15. An assembly according to claim 9, wherein said post is made of steel and said grill grate holder is made of aluminum.

* * * * *